(12) United States Patent
Hovanec et al.

(10) Patent No.: US 7,592,415 B2
(45) Date of Patent: Sep. 22, 2009

(54) INFRARED SOLVENT STRIPPING PROCESS

(75) Inventors: Joseph Brian Hovanec, Richmond, VA (US); Simon Frisk, Richmond, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 139 days.

(21) Appl. No.: 11/640,625

(22) Filed: Dec. 18, 2006

(65) Prior Publication Data

US 2008/0146698 A1 Jun. 19, 2008

(51) Int. Cl.
*C08G 73/10* (2006.01)
*C08F 6/00* (2006.01)

(52) U.S. Cl. .............. 528/497; 134/2; 134/26; 134/38; 264/233; 442/351

(58) Field of Classification Search ........ 134/2, 134/26, 38; 264/233; 442/351; 528/497
See application file for complete search history.

(56) References Cited

U.S. PATENT DOCUMENTS

| 3,503,134 | A | | 3/1970 | Fleissner |
| 3,808,846 | A | | 5/1974 | Fleissner |
| 3,983,095 | A | * | 9/1976 | Bashaw et al. ........... 525/327.7 |
| 4,738,868 | A | | 4/1988 | Fischer |
| 5,567,237 | A | | 10/1996 | Kapp-Schwoerer |
| 5,837,372 | A | * | 11/1998 | Wilkinson et al. ......... 428/400 |
| 6,986,830 | B2 | | 1/2006 | Scherb et al. |
| 2002/0092423 | A1 | | 7/2002 | Gillingham et al. |
| 2008/0113575 | A1 | * | 5/2008 | Davis ........................ 442/351 |
| 2008/0142737 | A1 | * | 6/2008 | Hovanec et al. ......... 250/492.1 |

FOREIGN PATENT DOCUMENTS

| WO | 03/039830 A | 5/2003 |
| WO | 03/080905 A | 10/2003 |
| WO | WO 03/080905 A1 | 10/2003 |

* cited by examiner

*Primary Examiner*—Terressa M Boykin

(57) ABSTRACT

A process for stripping chemically bonded spinning solvent from a solution-spun nonwoven web comprising the steps of providing a nonwoven web comprising solvent-laden polymeric fibers having average fiber diameters of less than about 1 micrometer, and transporting the nonwoven web through a solvent stripping zone wherein infrared radiation irradiates the nonwoven web and a solvent stripping fluid impinges on the nonwoven web in order to reduce the solvent concentration of the fibers to less than about 10,000 ppmw.

14 Claims, 2 Drawing Sheets

INFRARED SOLVENT STRIPPING PROCESS

A process for stripping solvent from solvent-laden fibers in a solution-spun fiber web is disclosed.

BACKGROUND

The process of solution spinning involves dissolving a desired polymer into a suitable solvent, and spinning fibers from the polymer/solvent solution. Often, the solvent is an organic solvent which has undesirable properties in use of the so-formed fabric, such as adverse health effects, undesired odor and the like. It would be desirable to strip the unwanted solvent from the fibers or fabric during the production process, prior to shipping to the ultimate customer.

Solution spinning processes are frequently used to manufacture fibers and nonwoven fabrics, and in some cases have the advantage of high throughputs, such that the fibers or fabrics can be made in large, commercially viable quantities. Unfortunately, when solution spinning large quantities of fabric at high throughput through the spinning dies, significant quantities of residual solvent can be entrained in the collected fabrics or fibers. Ideally, the residual solvent would merely evaporate upon sitting, leaving the fabric solvent-free, but in many cases the ideal solvent used for the solution spinning process has a high chemical or physical affinity for the fiber polymer. In some cases, the fiber polymer is swollen by the solvent; i.e. the solvent is "dissolved" within the fiber polymer. In other cases the solvent chemically bonds to the fiber, such as by hydrogen bonding, Van der Waals forces, or even ionically via salt formation.

Further, in typical nonwoven fabric spinning processes, the fabric is spun and wound into a large roll in an essentially continuous operation, such that even if the solvent were amenable to evaporation upon sitting, only the solvent entrained in the fabric on the outside of the roll is effectively evaporated, since the underlying fabric within the roll is not exposed to the atmosphere. Detrimentally, even if the fabric were to be provided sufficient time in the unrolled state to permit the spinning solvent to evaporate, an exceedingly long area would be necessary to provide room for the unrolled fabric, and recovery of the evaporated solvent would be difficult and expensive.

In paper making processes, such as those disclosed in U.S. Pat. Nos. 3,503,134 and 6,986,830, dewatering of the wet laid cellulose fibers which form the paper is performed by passing the wet laid cellulose web over a vacuum-assisted porous drum, and the excess water from the forming process is drawn through and away from the paper web. U.S. Pat. No. 3,503,134 discloses the use of hot air, superheated steam or a steam-air mix to enhance the drying effect of the vacuum assist. U.S. Pat. No. 6,986,830 discloses positioning the wet laid paper web between two soft, porous cloth webs, wherein the porous cloths on either side of the paper web pull additional water from the paper by capillary action. However, in either case, while it is advantageous to remove as much water as possible from the wet laid paper web, residual water is non-toxic and would not cause adverse health effects if present in the finished product.

U.S. Published patent application No. 2002/0092423 discloses a solution spinning process for forming a nonwoven polymer web, in particular an electrospinning process, wherein polymeric microfibers or nanofibers are produced from a polymer solution exiting an electrically-charged rotating emitter and directed toward a grounded collector grid. However, according to the applicants thereof, the solvent is evaporated from the fibers "in flight" between the emitter and the collector grid. The throughput of the electrospinning process disclosed in U.S. Published patent application No. 2002/0092423 is relatively low at about 1.5 ml/min/emitter, and as such would form relatively light basis weight polymer webs.

SUMMARY OF THE INVENTION

In a first embodiment, the invention is a process for stripping chemically bonded spinning solvent from a solution-spun nonwoven web comprising the steps of providing a nonwoven web comprising solvent-laden polymeric fibers having average fiber diameters of less than about 1 micrometer, and transporting the nonwoven web through a solvent stripping zone wherein infrared radiation irradiates the nonwoven web and a solvent stripping fluid impinges on the nonwoven web in order to reduce the solvent concentration of the fibers to less than about 10,000 ppmw.

BRIEF DESCRIPTION OF THE DRAWINGS

The accompanying drawings, which are incorporated in and constitute a part of this specification, illustrate the presently contemplated embodiments of the invention and, together with the description, serve to explain the principles of the invention.

DETAILED DESCRIPTION OF THE INVENTION

Figure 1:
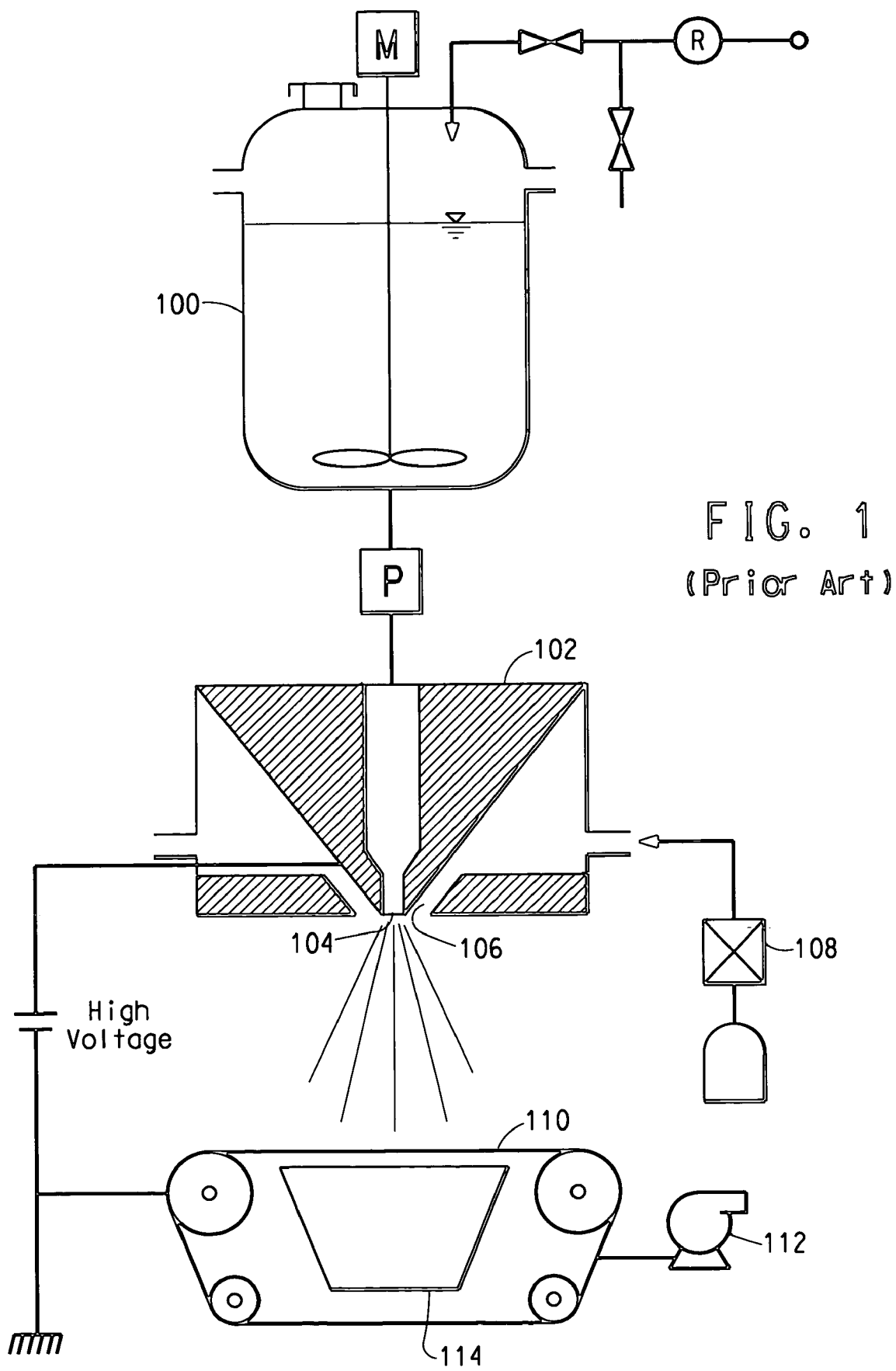
FIG. 1 is a schematic of a prior art electroblowing apparatus for preparing a nanofiber web according to the invention.

The present invention relates to solvent-spun webs and fabrics for a variety of customer end-use applications, such as filtration media, energy storage separators, protective apparel and the like, including at least one nanofiber layer, and a process for removing excess spinning solvent from the solution-spun nanofiber webs or fabrics.

There is a need for fibrous products made from a wide variety of polymers to suit various customer end-use needs. Many polymeric fibers and webs can be formed from melt spinning processes, such as spun bonding and melt blowing. However, the ability to use melt spinning is limited to spinning fibers from polymers which are melt processable, i.e. those which can be softened or melted and flow at elevated temperatures. Still, in many end-uses, it is desirable to utilize polymers which are not melt processable, for example thermosetting polymers and the like, to form fibrous materials, fabrics and webs. In order to form these non-melt-processable polymers into fibrous materials, the technique of solution spinning is used.

As discussed above, solution spinning processes, such as wet spinning, dry spinning, flash spinning, electrospinning and electroblowing, involve dissolving a desired polymer into a suitable solvent, and spinning fibers from the polymer/solvent solution. Often, the solvent is an organic solvent which has undesirable properties in use of the so-formed fabric, such as adverse health effects, undesired odor and the like. It would be desirable to strip the unwanted solvent from the fibers or fabric during the production process, prior to shipping to the ultimate customer.

Unfortunately, when solution spinning large quantities of fabric at high throughput through the spinning dies, such as to form nonwoven webs having basis weights of greater than about 5 grams/square meter (gsm), significant quantities of residual solvent can be entrained in the collected fabrics or fibers, due to either or both of high physical or chemical affinities of the solvent for the polymer so spun, and the lack of sufficient time or space between fiber formation and fiber collection for complete evaporation of the spinning solvent. In many cases, the solvents used in the solution spinning processes demonstrate various levels of toxicity, or present negative environmental effects or cause adverse chemical reactions in particular end-uses. As such, it is preferred to remove as much residual solvent from the solution spun fibrous materials as possible.

Solvent removal is often complicated by the fact that any particular polymer/solvent spinning system is chosen based upon a strong affinity of the solvent for the polymer, in order to effect complete dissolution of the polymer in the solvent during the spinning operation. In some cases, the fiber polymer is swollen by the solvent; i.e. the solvent is "dissolved" within the fiber polymer. In other cases the solvent chemically bonds to the fiber, such as by hydrogen bonding, Van der Waals forces, or even ionically via salt formation.

In some prior art solvent spinning processes, such as dry spinning, removal of high affinity solvents is accomplished by spinning the fibers into a hot gas "chimney" of as much as 30 feet in length, and passing high temperature gas (as high as 500° C.) through the chimney to drive off the unwanted solvent. As can be imagined, this process involves an expensive apparatus and is an energy-intensive process.

It has been discovered that one manner of enhancing unwanted solvent removal from solution spun fibers is to reduce the diameter of the fibers themselves, since the diffusion de-volatilization mechanisms follow a 1/diameter$^2$ relationship. That is, entrained solvent will diffuse more readily out of fibers having smaller diameters than out of fibers having larger diameters. According to the present invention, it is preferred that solution spun fibers have diameters less than about 1 micrometer (nanofibers) to optimize the diffusion de-volatilization mechanism of solvent removal.

The term "nanofibers" refers to fibers having diameters varying from a few tens of nanometers up to several hundred nanometers, but generally less than about one micrometer, even less than about 0.8 micrometer, and even less than about 0.5 micrometer.

The solution spun fabrics and webs of the present invention include at least one layer of polymeric nanofibers. The nanofibers have average fiber diameters of less than about 1 μm, preferably between about 0.1 μm and about 1 μm, and high enough basis weights to satisfy a variety of commercial end-uses, such as for air/liquid filtration media, energy storage separators, protective apparel and the like.

The process for making commercial quantities and basis weights of nanofiber layer(s) is disclosed in International Publication Number WO2003/080905 (U.S. Ser. No. 10/822, 325), which is hereby incorporated by reference. FIG. 1 is a schematic diagram of an electroblowing apparatus useful for carrying out the process of the present invention using electroblowing (or "electro-blown spinning") as described in International Publication Number WO2003/080905. This prior art electroblowing method comprises feeding a solution of a polymer in a solvent from mixing chamber 100, through a spinning beam 102, to a spinning nozzle 104 to which a high voltage is applied, while compressed gas is directed toward the polymer solution in a blowing gas stream 106 as it exits the nozzle to form nanofibers, and collecting the nanofibers into a web on a grounded collector 110 under vacuum created by vacuum chamber 114 and blower 112.

The moving collection apparatus is preferably a moving collection belt positioned within the electrostatic field between the spinning beam 102 and the collector 110. After being collected, the nanofiber layer is directed to and wound onto a wind-up roll on the downstream side of the spinning beam. Optionally, the nanofiber web can be deposited onto any of a variety of porous scrim materials arranged on the moving collection belt 110, such as spunbonded nonwovens, meltblown nonwovens, needle punched nonwovens, woven fabrics, knit fabrics, apertured films, paper and combinations thereof.

Due to the high throughput of the electroblowing apparatus, typically between about 0.1 to 5 m/hole/min, and the large number of spinning nozzles (holes) 104 distributed across the spinning beam 102, a single nanofiber layer having a basis weight of between about 2 g/m$^2$ and about 100 g/m$^2$, even between about 10 g/m$^2$ and about 90 g/m$^2$, and even between about 20 g/m$^2$ and about 70 g/m$^2$, as measured on a dry basis, i.e., after the residual solvent has evaporated or been removed, can be made by depositing nanofibers from a single spinning beam in a single pass of the moving collection apparatus. However, also due to the high throughput of the process and the speed at which the electroblown fibers are collected on the collection belt, significant quantities of residual spinning solvent, especially those solvents with strong affinities for the fiber polymers, can remain in the nanofiber webs so-formed.

It has been discovered that reducing fiber diameter, even to below 1 micrometer, or even to below about 0.8 micrometer, or even below about 0.5 micrometer, is alone insufficient to reduce or eliminate residual solvent from the nanofiber web merely by vacuum-assisted collection.

Figure 2:
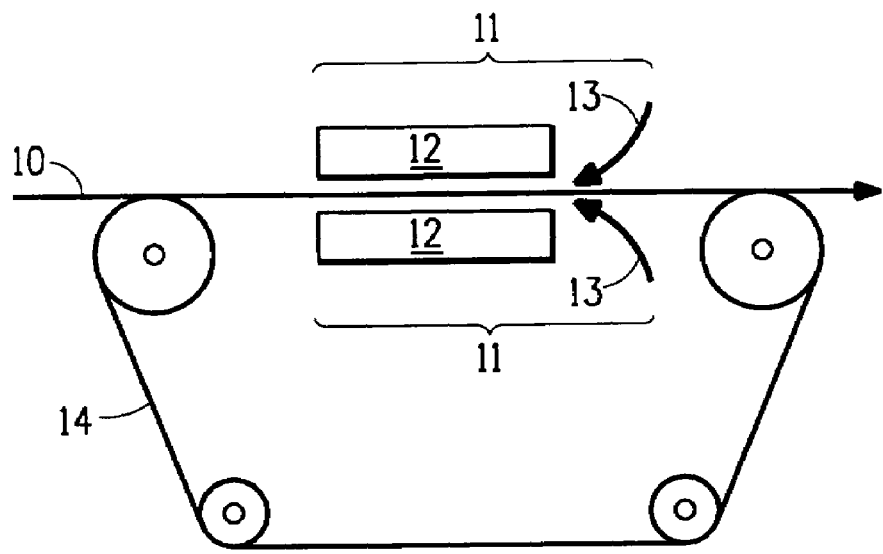
FIG. 2 is a schematic of an infrared solvent stripping station according to the present invention.

Accordingly, the solvent stripping process and apparatus of the present invention, FIG. 2, which is disposed downstream of the collection belt 110 of the prior art apparatus (FIG. 1), acts to effect reduction or elimination of unwanted residual solvent from solution spinning processes in a continuous manner, prior to wind-up of the fabric or web.

The infrared solvent stripping apparatus comprises an optional continuous moving belt 14 for supporting the solvent spun nanofiber web and its optional supporting scrim 10 and directing it through one or more infrared solvent stripping stations 11, each of which comprise an infrared radiation source 12 and a fresh or low solvent content solvent stripping fluid 13. The infrared solvent stripping stations 11 can be positioned on either or both sides of the plane of the solvent spun nanofiber web. FIG. 2 shows two infrared solvent stripping stations 11 on opposite sides of the plane of the solvent spun nanofiber web. Alternatively, a single infrared solvent stripping station can be positioned on one side of the nanofiber web, and the nanofiber web can be pinned to the moving belt 14 with a vacuum station (not shown) on the opposite side of the belt. The fresh solvent stripping fluid 13, typically air, is impinged upon the moving solution spun web, and draws the stripping fluid away from the solution spun web to effect solvent stripping. Preferably, a spent solvent stripping fluid collector (not shown) is disposed downstream of the solvent stripping zone to scrub the excess spinning solvent from the spent stripping fluid for recycling or disposal.

The fresh solvent stripping fluid can be a gas selected from air, nitrogen, argon, helium, carbon dioxide, hydrocarbons, halocarbons, halohydrocarbons, and mixtures thereof, and is essentially free from vapors of the spinning solvent to be stripped, such that the partial pressure of the spinning solvent is much higher within the polymer fibers of the solution spun web than in the solvent stripping fluid, so as to drive diffusion of the residual stripping solvent from the solvent-laden polymer fibers into the solvent stripping fluid. However, even this differential in partial pressures is insufficient to extract a spinning solvent with high affinity for the fiber polymer down to concentration levels on or within the fibers which are suitable for many consumer uses.

It has been discovered that heating the fresh solvent stripping fluid to temperatures of at least about 70° C. up to as high as the melting point of the polymer (in the case of a thermoplastic polymer) or just below the decomposition temperature of the polymer (in the case of a non-thermoplastic polymer) for short periods of time to avoid polymer melting or decomposition can increase the rate of solvent removal.

Utilizing the combination of infrared radiation and "fresh" solvent stripping fluid (i.e. one having very low partial pressure of the spinning solvent), it is possible to reduce the solvent concentration on or in the fiber polymer to less than about 10,000 ppmw, even to less than 1000 ppmw, or even less than about 300 ppmw.

Polymer/solvent combinations which can benefit from the present invention are those in which the polymer exhibits a strong affinity for the solvent, particularly those in which chemical bonding occurs between the polymer and the solvent, such as hydrogen bonding and the like. Some combinations of polymer/solvent which are difficult to separate are polyamide/formic acid and polyvinyl alcohol/water.

Depending on the affinity of the particular spinning solvent for the fiber polymer, it may be advantageous to incorporate more than one solvent stripping station into the solvent stripping apparatus, so as to reduce the residual solvent concentration in multiple steps. The additional solvent stripping apparatuses can be either an infrared solvent stripping apparatus, described above, or a fluid/vacuum solvent stripping station.

Figure 3:
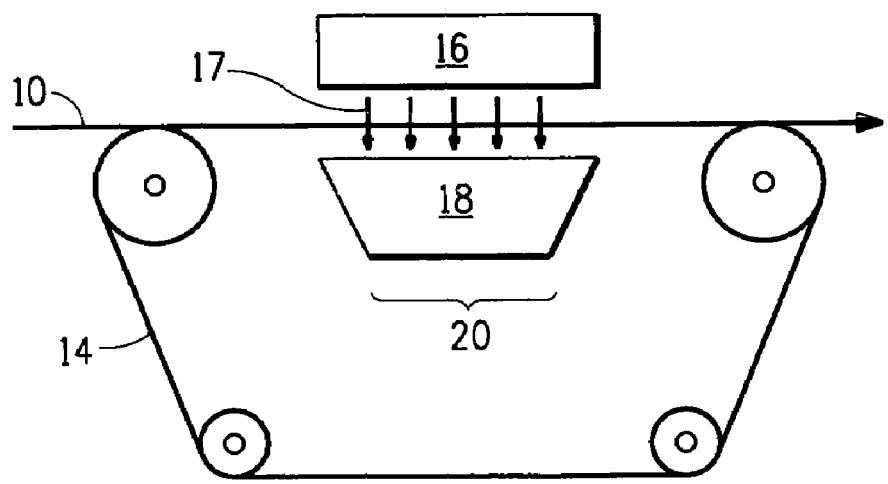
FIG. 3 is a schematic of a fluid/vacuum solvent stripping station according to the present invention.

A fluid/vacuum solvent stripping process and apparatus, FIG. 3, can be disposed downstream of the collection belt 110 of the prior art apparatus (FIG. 1) and disposed either before or after the infrared solvent stripping apparatus, which can further act to effect reduction or elimination of unwanted residual solvent from solution spinning processes in a continuous manner, prior to wind-up of the fabric or web.

The fluid/vacuum solvent stripping apparatus comprises an optional continuous moving belt 15 for supporting the solvent spun nanofiber web and its optional supporting scrim 10 and directing it through one or more solvent stripping stations 20, each of which comprise a fresh solvent stripping fluid heating apparatus 16, disposed on one side of the moving belt 15, and a vacuum apparatus 18, disposed on the opposite side of moving belt 15. The fresh solvent stripping fluid 17, typically air, is impinged upon the moving solution spun web, and the vacuum apparatus helps to draw the stripping fluid through the solution spun web to effect solvent stripping. Preferably, a spent solvent stripping fluid collector (not shown) is disposed downstream of the vacuum apparatus to scrub the excess spinning solvent from the spent stripping fluid for recycling or disposal. The temperature, vacuum pressure and even the fresh solvent stripping fluid itself can be individually controlled within each solvent stripping station.

The relatively high temperatures necessary to de-couple the spinning solvents from the polymers are unexpected, as the skilled artisan would expect that the solvent would evaporate at room temperatures within the space between the spinning nozzles and the collector, as set forth in U.S. Published patent application No. 2002/0092423. Instead, it was found to be necessary to apply temperatures well-above the spinning solvent boiling point to reduce the spinning solvent levels to less than about 1000 ppmw in a continuous process and within a commercially viable time.

EXAMPLES

The examples below were prepared from a polymer solution having a concentration of 24 wt % of nylon 6,6 polymer, Zytel® FE3218 (available from E.I. du Pont de Nemours and Company, Wilmington, Del.) dissolved in formic acid solvent at 99% purity (available from Kemira Oyj, Helsinki, Finland) that was electroblown to form a nonwoven web containing some residual solvent.

The residual formic acid content in the nonwoven sheets of nylon was determined using standard wet chemistry techniques and ion chromatography analysis. In a typical determination, a sample of known mass was placed in caustic solution. An aliquot of the resulting solution was analyzed by ion chromatography and the area under the peak corresponding to neutralized formic acid (formate anion) was proportional to the quantity of formic acid in the sample.

Comparative Example A

Comparative Example A was prepared as set forth above, but was not subjected to the solvent stripping process of the present invention. The solvent level upon web laydown was 46.2 wt % (462,000 ppm) of the nonwoven web.

Comparative Example B

Comparative Example B was prepared in the manner of Comparative Example A, except rather than collecting and analyzing the nonwoven sheet directly after laydown, the nonwoven web was transported into a fluid/vacuum solvent stripping zone on a moving porous screen. A solvent stripping fluid of air at a temperature of 90° C. was impinged onto the nonwoven web from one side while a vacuum was applied to the other side of the nonwoven web. The vacuum was measured at 40 mm $H_2O$. The air pressure and the vacuum were coupled to yield a near constant atmospheric pressure in the solvent stripping zone. The nonwoven web remained in the solvent stripping zone for 30 seconds. The final solvent level was 0.465 wt % (4650 ppm) of the nonwoven web.

Example 1

Example 1 was prepared in the same manner as Comparative Example B except it was additionally transported through an infrared solvent stripping zone. This additional step consisted in transporting the web through a floatation dryer. The dryer consists of three sections composed of two banks of infrared heaters each, both above and below the web. The infrared heaters used were Radplane Series 80 Heaters rated at 31.4 kW, 480 volts, 1 phase, medium wavelength available from GlenRo. Hot air at a temperature of 198° C. was swept above and below the web countercurrent to the web motion. The web was fed through the dryer at a of speed 18 meters per minute, corresponding to a total residence time of approximately 8 seconds. The sheet temperature in the oven was measured to be on average 181° C. The final solvent level was 0.013 wt % (130 ppm) of the nonwoven web.

Comparative Example A demonstrates the level of stripping solvent which is entrained in the nanofiber webs after the prior art electroblowing process.

Comparative Example B shows the effect of a fluid/vacuum based solvent stripping zone, which removed residual solvent to levels suitable for some commercial uses.

Example 1 shows the effect of an infrared based solvent stripping method with web temperatures well in excess of the boiling point of the solvent (101° C. for formic acid) results in extremely low residual solvent level in the electrospun web.

This example demonstrates that the infrared based solvent stripping zone of the present invention can prepare a solution spun nonwoven web that is substantially free of spinning solvent.

What is claimed is:

1. A process for stripping chemically bonded spinning solvent from a solution-spun nonwoven web comprising the steps of:
    providing a nonwoven web comprising solvent-laden polymeric fibers having average fiber diameters of less than about 1 micrometer,
    transporting the nonwoven web through a first zone in which a solvent stripping fluid impinges on the nonwoven web in order to reduce the solvent concentration of the fibers to less than about 10,000 ppmw, and
    transporting the nonwoven web through a second zone wherein infrared radiation irradiates the nonwoven web and the bound solvent concentration is reduced to less than about 1000 ppmw.

2. The process according to claim 1 wherein the average fiber diameter is less than 0.8 micrometer.

3. The process according to claim 2, wherein the average fiber diameter is less than 0.5 micrometer.

4. The process according to claim 1, wherein the solvent stripping fluid is heated.

5. The process according to claim 4, wherein the solvent stripping fluid is heated to between about 70° C. and the melting point of the fiber polymer.

6. The process according to claim 4, wherein the solvent stripping fluid is heated to between about 70° C. and the decomposition point of the fiber polymer.

7. The process according to claim 1, wherein the solvent stripping fluid is selected from the group of air, nitrogen, argon, helium, carbon dioxide, hydrocarbons, halocarbons, halohydrocarbons, and mixtures thereof.

8. The process according to claim 7, wherein the solvent stripping fluid is air.

9. The process according to claim 1, wherein the bound solvent concentration is reduced to less than 300 ppmw.

10. The process according to claim 1, further comprising transporting the web through the solvent stripping zone by pinning the nonwoven web to a moving porous belt with a vacuum source located on the side of the porous belt opposite the nonwoven web, and passing fresh solvent stripping fluid through the web.

11. The process according to claim 1, wherein the nonwoven web is transported through the solvent stripping zone on top of a scrim.

12. The process according to claim 1, further comprising transporting the nonwoven web through at least one additional solvent stripping zone.

13. The process according to claim 12, wherein the at least one additional solvent stripping zone wherein a solvent stripping fluid heated to at least about 70° C. impinges on the nonwoven web.

14. The process according to claim 13, wherein the nonwoven web is transported through the at least one additional solvent stripping zone prior to the solvent stripping zone which includes the infrared radiation.

* * * * *